(12) United States Patent
Ihara

(10) Patent No.: US 12,434,289 B2
(45) Date of Patent: Oct. 7, 2025

(54) PROCESSING METHOD

(71) Applicant: TOYOTA JIDOSHA KABUSHIKI KAISHA, Toyota (JP)

(72) Inventor: Tomoaki Ihara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 245 days.

(21) Appl. No.: 18/323,565

(22) Filed: May 25, 2023

(65) Prior Publication Data

US 2023/0405660 A1    Dec. 21, 2023

(30) Foreign Application Priority Data

Jun. 20, 2022   (JP) ................................. 2022-098801

(51) Int. Cl.
| | | |
|---|---|---|
| B21D 37/16 | (2006.01) | |
| B21D 19/00 | (2006.01) | |
| B21D 19/08 | (2006.01) | |
| B21D 28/02 | (2006.01) | |
| B21D 35/00 | (2006.01) | |
| C21D 1/10 | (2006.01) | |
| C21D 1/42 | (2006.01) | |
| C21D 9/00 | (2006.01) | |
| H05B 6/40 | (2006.01) | |

(52) U.S. Cl.
CPC ............. *B21D 37/16* (2013.01); *B21D 19/08* (2013.01); *B21D 28/02* (2013.01)

(58) Field of Classification Search
CPC ...... B21D 37/16; B21D 19/08; B21D 19/005; B21D 28/02; B21D 35/002; C21D 1/42; C21D 9/0068; C21D 1/10; H05B 6/101; H05B 6/40
See application file for complete search history.

(56) References Cited

U.S. PATENT DOCUMENTS

| 3,815,395 | A | 6/1974 | Sass | |
| 2016/0316523 | A1* | 10/2016 | Inaba | ...................... C21D 1/42 |
| 2016/0325333 | A1 | 11/2016 | Sakane et al. | |
| 2020/0238360 | A1* | 7/2020 | Ihara | ...................... B21D 28/26 |
| 2020/0239974 | A1* | 7/2020 | Ihara | .................... B21D 19/005 |

(Continued)

FOREIGN PATENT DOCUMENTS

| EP | 3 084 016 A2 | 10/2016 |
| EP | 3 685 933 A1 | 7/2020 |

(Continued)

*Primary Examiner* — Mohammed S. Alawadi

(74) *Attorney, Agent, or Firm* — Sughrue Mion, PLLC

(57) ABSTRACT

It is possible to improve heating efficiency of an end surface of an open trim edge. A processing method includes punching a steel plate to open a part of an end surface of the steel plate to form an open trim edge, and disposing a heating coil in a non-contact manner along the end surface of the open trim edge formed in the punching to sandwich the end surface of the open trim edge therebetween, and heating the end surface of the open trim edge by applying an alternating current to the heating coil to generate an induced electromotive force on the steel plate. A current direction of the heating coil disposed on one side of the end surface of the open trim edge is opposite to a current direction of the heating coil disposed on another side of the end surface of the open trim edge.

10 Claims, 20 Drawing Sheets

(56) References Cited

U.S. PATENT DOCUMENTS

2022/0049324 A1 2/2022 Nakagawa et al.
2022/0219220 A1 7/2022 Ihara

FOREIGN PATENT DOCUMENTS

| | | |
|---|---|---|
| JP | 48-41965 A | 6/1973 |
| JP | 2020-116635 A | 8/2020 |
| JP | 2022-108601 A | 7/2022 |
| WO | 2015/098045 A1 | 7/2015 |
| WO | 2020/175486 A1 | 9/2020 |

* cited by examiner

PUNCHING STEP

HEATING STEP (COOLING STEP)

PROCESSING STEP

INSERT

HEAT

REMOVE

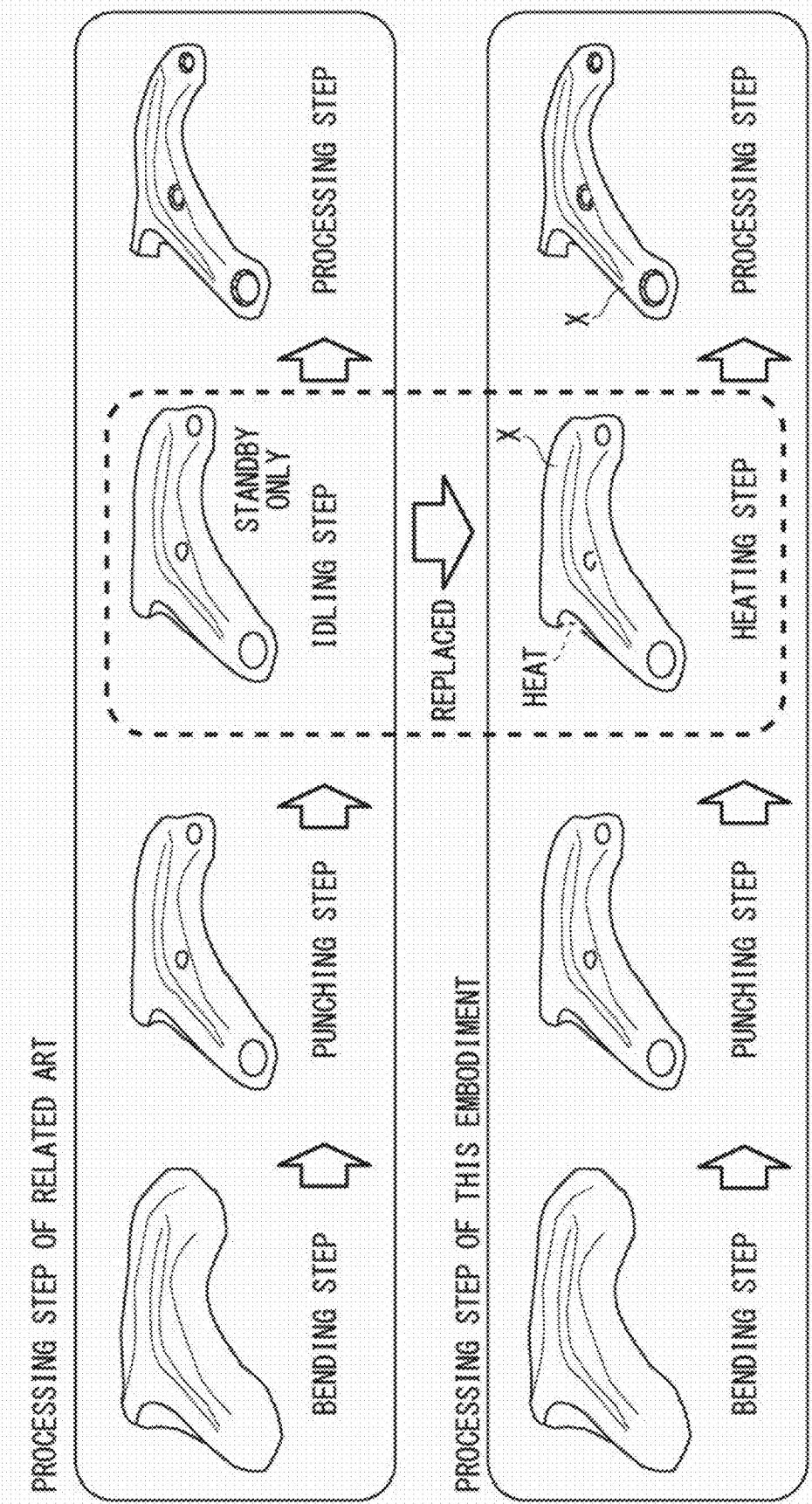

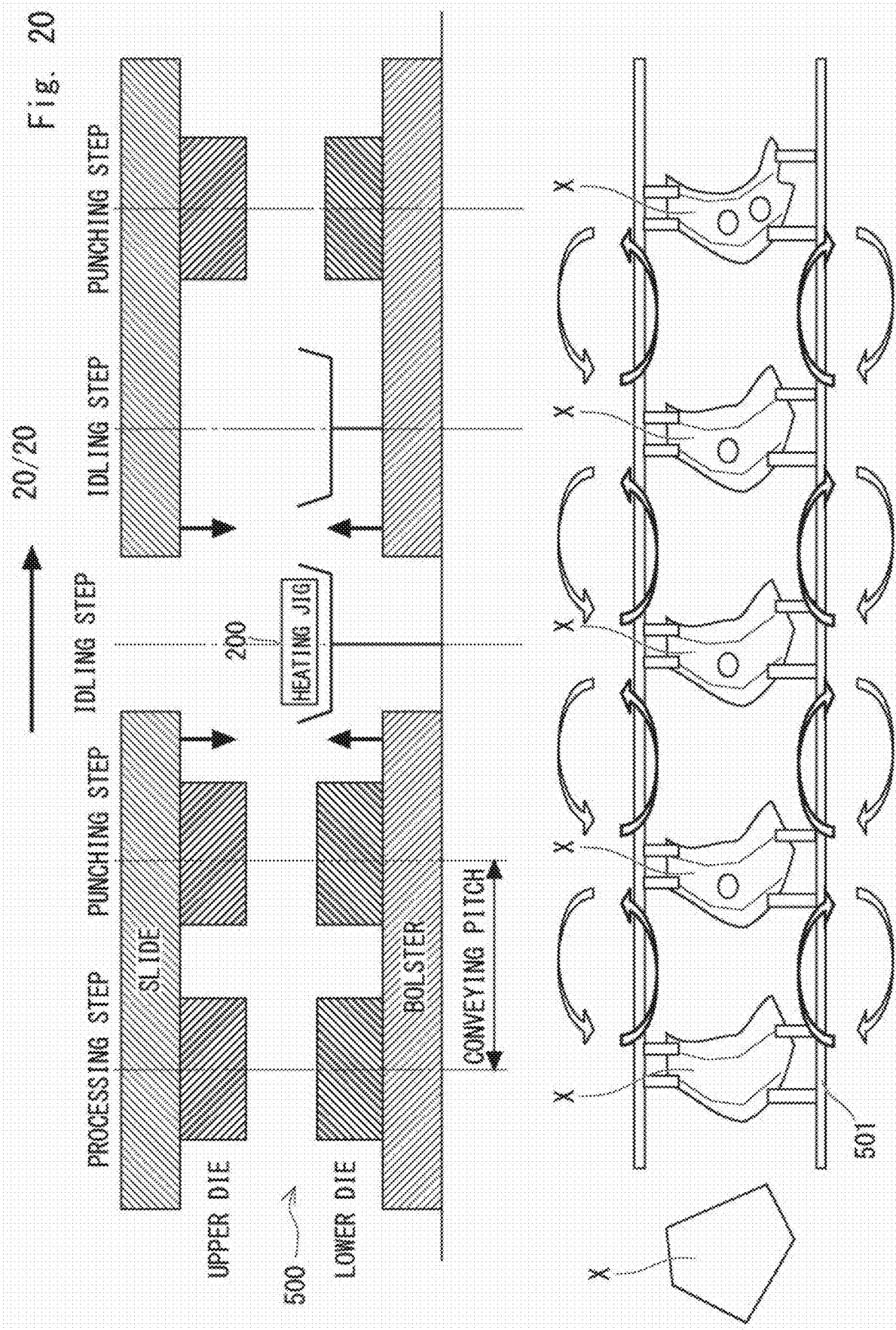

PROCESSING METHOD

CROSS REFERENCE TO RELATED APPLICATIONS

This application is based upon and claims the benefit of priority from Japanese patent application No. 2022-098801, filed on Jun. 20, 2022, the disclosure of which is incorporated herein in its entirety by reference.

BACKGROUND

The present disclosure relates to a method for processing a steel plate.

One of the issues in press-forming of a high tensile strength steel is cracking in a stretch flange. This cracking in a stretch flange occurs due to residual strain on a shear end surface such as trim edges formed in a punching step.

As a method to reduce the residual strain, a processing method has been proposed in which a loop-shaped heating coil is disposed along an end surface of a trim edge formed in a punching step, and the end surface of the trim edge being faced in such a way that the loop-shaped heating coil is not brought into contact with the end surface, and an alternating current is applied to the heating coil to generate an induced electromotive force on a steel plate to thereby heat the end surface (see, e.g., Japanese Unexamined Patent Application Publication No. 2022-108601).

SUMMARY

However, when the end surface of the open trim edge of the steel plate, where a part of the end surface is open, is heated by the aforementioned loop-shaped heating coil, a current flows on the end surface, but the current is dispersed away from the end surface and flows in the inside of the steel plate in a direction opposite to direction in which the current flows on the end surface to form a loop. This may reduce the current density on the end surface and thus reduce the heating efficiency.

The present disclosure has been made to solve such a problem and a main object thereof is to provide a processing method capable of improving heating efficiency of an end surface of an open trim edge.

In an aspect of the present disclosure to achieve the above object, a processing method includes:
punching a steel plate to open a part of an end surface of the steel plate to form an open trim edge; and
disposing a heating coil in a non-contact manner along the end surface of the open trim edge formed in the punching to sandwich the end surface of the open trim edge therebetween, and heating the end surface of the open trim edge by applying an alternating current to the heating coil to generate an induced electromotive force on the steel plate.

A current direction of the heating coil disposed on one side of the end surface of the open trim edge is opposite to a current direction of the heating coil disposed on another side of the end surface of the open trim edge.

In this aspect, in the heating,
the heating coil on the one side of the end surface of the open trim edge may be disposed on a side of the opened part of the end surface of the steel plate, and
the heating coil on the other side of the end surface of the open trim edge may be disposed on a side of the steel plate.

In this aspect,
in the heating,
the one side on which the heating coil is disposed may be an upper side and the side on which the other side is disposed may be a lower side, and
in a cross-sectional view of the open trim edge, the upper heating coil, and the lower heating coil,
viewed from a vertical direction, a cross-section of the upper heating coil may not overlap a cross-section of the open trim edge, while a cross-section of the lower heating coil may overlap the cross-section of the open trim edge.

In this aspect,
the upper heating coil may be disposed within a rectangular upper proper range having a length a and a width b,
the lower heating coil may be disposed within a rectangular lower proper range having a length c and a width d,
the upper proper range may be set starting from an upper angle of the end surface of the open trim edge,
the lower proper range may be set starting from a position a predetermined distance α from a lower angle of the end surface of the open trim edge, and
when diameters of the upper heating coil and the lower heating coil are defined as D, the following relation may hold:

$$0 \le a \le 1.5 \times D$$

$$0 \le b \le 1.5 \times D$$

$$\alpha \le c \le 1.2 \times D$$

$$0 \le d \le 1.5 \times D$$

In this aspect,
forming a stretch flange at the open trim edge may be further included.

A distance between a central axis of the heating coil disposed on a side of the steel plate to be stretched and the end surface of the open trim edge may be shorter than a distance between a central axis of the heating coil disposed on a side of the steel plate opposite to the side of the steel plate to be stretched and the end surface of the open trim edge.

In this aspect,
the steel plate punched in the punching may be disposed on a heating jig and then heated by the heating coil in the heating,
the heating jig may include a positioning guide on which the steel plate punched in the punching is placed and which is for positioning the steel plate in a predetermined position, and the heating coil for heating the end surface of the open trim edge of the steel plate positioned by the positioning guide, and
when the steel plate punched in the punching is placed on the positioning guide, the heating coil positioned on a front side may be offset to an outer side of the steel plate.

In this aspect,
forming a stretch flange at the open trim edge may be further included.

In the heating, the heating coil may heat a curved flange-formed part of a framework member of a high tensile strength steel of the vehicle formed in the forming of the stretch flange.

In this aspect,
the heating may be performed during any step of the processing method in a pressing machine.

In this aspect,
forming a stretch flange at the trim edge may be further included.

The heating may be carried out in idling for adjusting a conveying pitch when the steel plate is conveyed from a place where the punching is performed to a place where the forming is performed.

In this aspect,
in the pressing machine, while a steel plate formed product is continuously conveyed by a holding part, at least the punching and the idling may be continuously carried out at a predetermined conveying pitch.

By disposing the heating jig including the heating coil at a position corresponding to the idling, the idling may be replaced by the heating.

According to the present disclosure, it is possible to provide a processing method capable of improving heating efficiency of an end surface of an open trim edge.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 19 shows a comparison between steps of the processing method according to the embodiment and steps of a processing method according to related art; and FIG. 20 shows an example of steps in a pressing machine.

DESCRIPTION OF EMBODIMENTS

Hereinafter, the present disclosure will be described through embodiments of the disclosure, but the disclosure according to the claims is not limited to the following embodiments. Further, all of the configurations described in the embodiments are not necessarily essential as means for solving the problem.

First Embodiment

Figure 1:
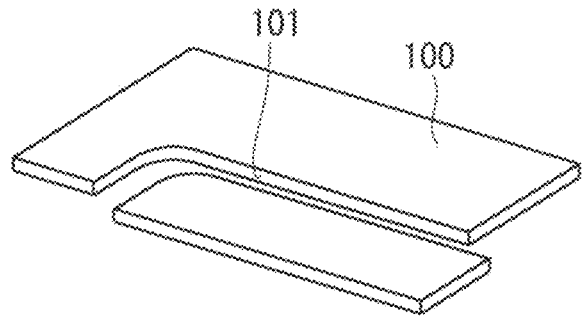
FIG. 1 is a schematic diagram schematically showing steps of a processing method according to an embodiment.
Figure 1:
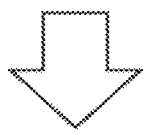
Figure 1:
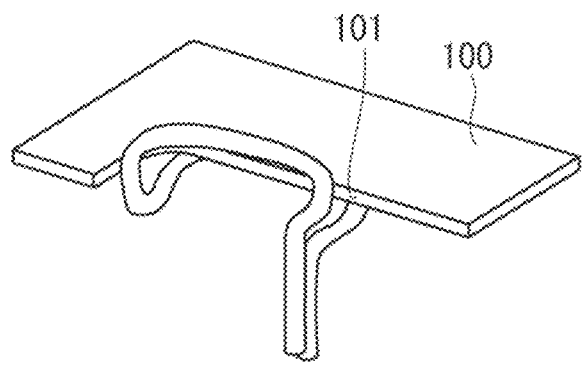
Figure 1:
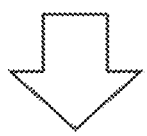
Figure 1:
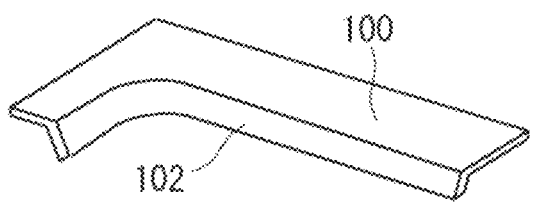

FIG. 1 is a schematic diagram schematically showing steps of a processing method according to this embodiment. In the processing method described below, a part of an end surface of a steel plate 100 as a workpiece is opened to form an open trim edge 101, and a stretch flange 102 is formed by deforming a periphery of the open trim edge 101.

As shown in FIG. 1, for example, the processing method according to the embodiment includes a punching step of punching a steel plate to form the open trim edge 101, a heating step of heating the open trim edge 101, a cooling step of reducing the heat generated in the heating step, and a processing step of forming a stretch flange 102 at the open trim edge 101.

The punching step includes punching the steel plate 100 fixed to a punching die (not shown) by a punch (not shown). As will be described in detail later, the heating step is a step of heating the open trim edge 101 formed in the punching step.

Figure 2:
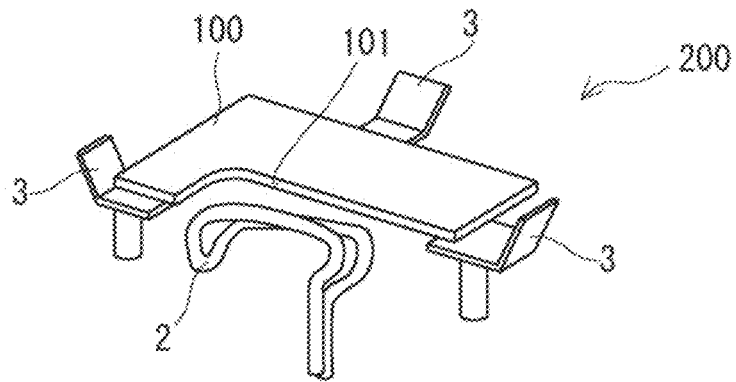
FIG. 2 is a schematic diagram schematically showing a heating step.
Figure 2:
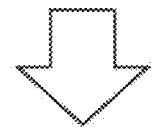
Figure 2:
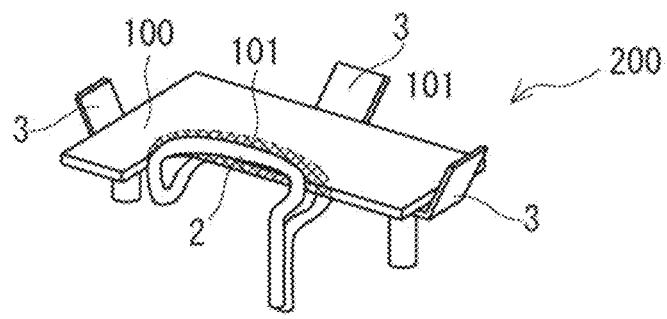
Figure 2:
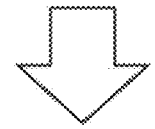
Figure 2:
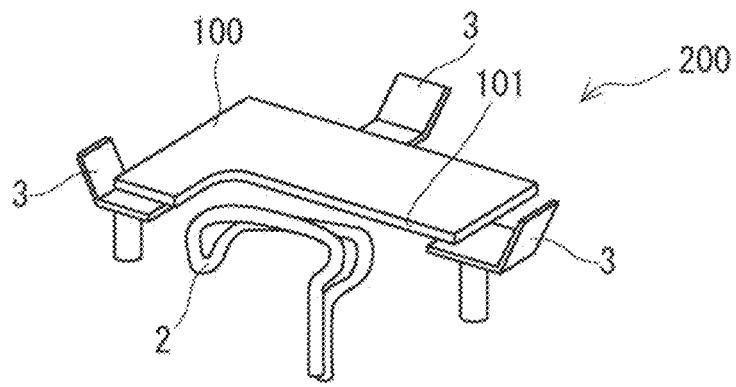

In the heating step, as shown in FIG. 2, the punched steel plate 100 is disposed on a positioning guide 3 of the heating jig 200. Next, induction heating is performed by the heating coil 2 on the open trim edge 101 of the steel plate 100. In this embodiment, for example, it is preferable to perform high-frequency induction heating in which a high-frequency alternating current is applied to the heating coil 2 to generate an induced electromotive force on the steel plate 100. After the steel plate 100 is heated by the heating coil 2, it is taken out of the heating jig 200.

The heating temperature by the heating coil 2 is adjusted in such a way that the trim edge 101 becomes, for example, 200° C. or higher and lower than the Ac1 point. The residual strain can be appropriately removed when the heating is within this temperature range. In particular, when the steel plate 100 is heated to the Ac1 point or higher, the steel plate 100 undergoes austenite transformation. Thus, the steel plate 100 softens when air-cooled or hardens when rapidly cooled by running water or the like, and then formability in the processing step decreases. Therefore, it is desirable to keep the heating temperature below the Ac1 point.

As shown in FIG. 1, the cooling step is a step of reducing the heat of the open trim edge 101 heated in the heating step. Specifically, the steel plate 100 is left for a certain time in a room temperature environment. It should be noted that the cooling step may be omitted in the processing method according to this embodiment. In this case, the processing step described later is performed after the heating step. The processing step (burring step) is a step of forming the stretch flange 102 by plastically deforming the open trim edge 101 with a flange die or the like.

Residual strain generated at the peripheral edge part of the open trim edge 101 in the punching step is removed in the heating step. A processing step is introduced after the cooling. Thus, it is possible to reduce the damage caused by a flange die more than when the processing is performed on the steel plate 100 in a heated state. In particular, in this embodiment, as described later, since the open trim edge 101 can be locally heated, the residual strain can be satisfactorily removed, and the heating efficiency is also improved.

Incidentally, in related art, the end surface of the open trim edge of the steel plate is heated by the aforementioned loop-shaped heating coil, a current flows on the end surface, but the current is dispersed away from the end surface and flows in the inside of the steel plate in a direction opposite to direction in which the current flows on the end surface to form a loop. This may reduce the current density on the end surface and reduce the heating efficiency.

Figure 3:
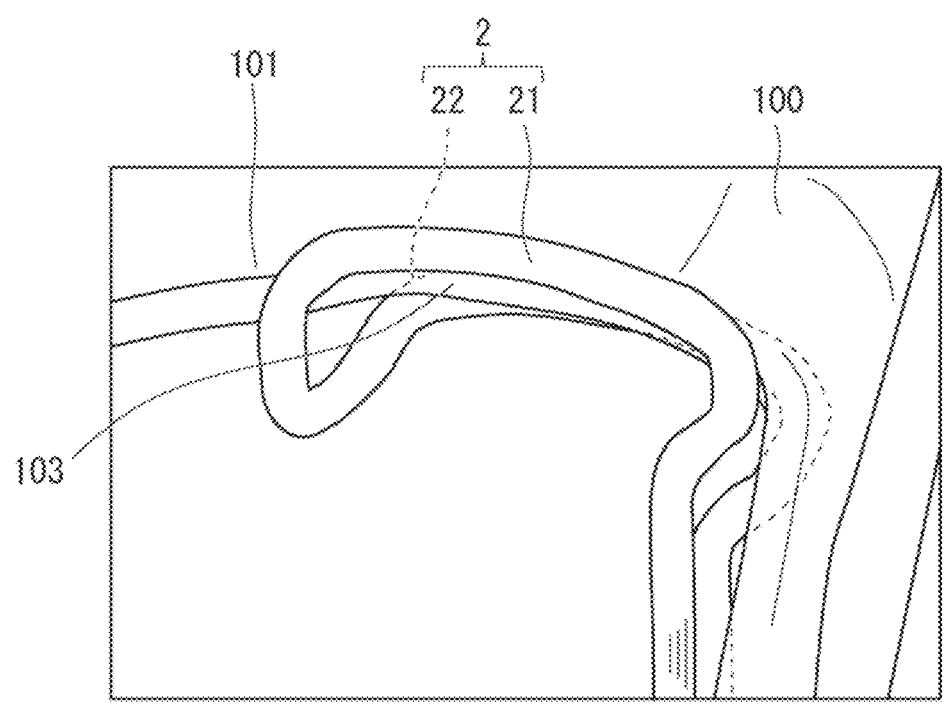
FIG. 3 is a perspective view of a heating coil according to the embodiment.
Figure 4:
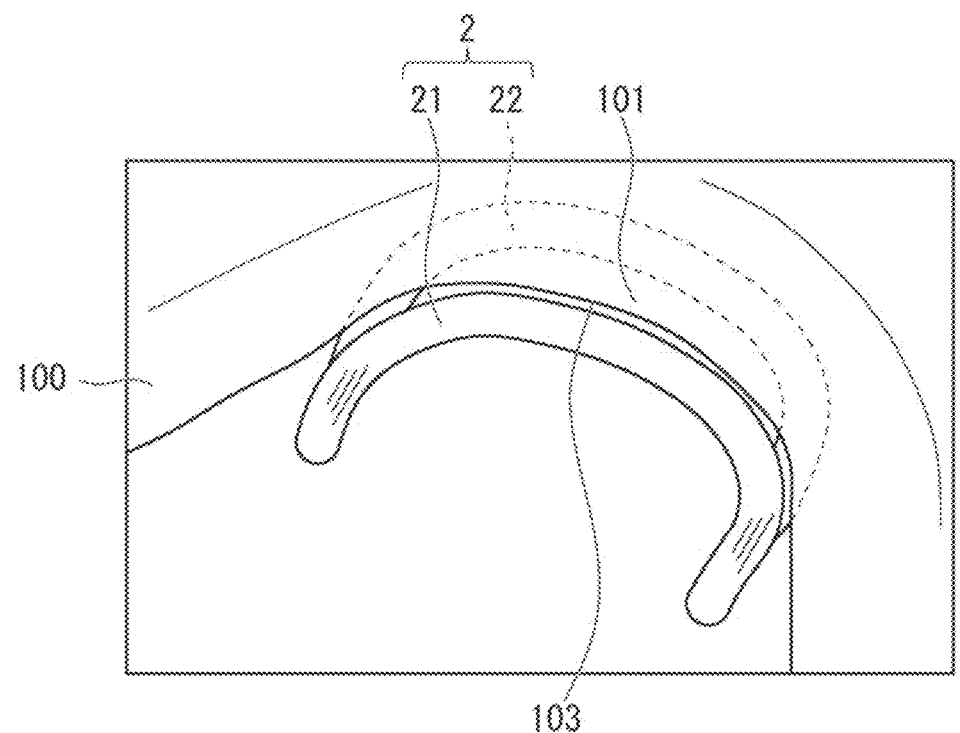
FIG. 4 is a top view of the heating coil according to the embodiment as viewed from above.

FIG. 3 is a perspective view of the heating coil according to this embodiment. FIG. 4 is a top view of the heating coil according to this embodiment as viewed from above.

In order to address the above problem, in the heating step of the processing method according to this embodiment, for example, as shown in FIGS. 3 and 4, the heating coil 2 is disposed in a non-contact manner along the end surface 103 of the open trim edge 101 formed in the punching step in such a way that the end surface 103 of the open trim edge 101 is sandwiched between the heating coil 2. The end surface 103 of the open trim edge 101 is heated by applying an alternating current to the heating coil 2 to generate an induced electromotive force on the steel plate 100. Furthermore, a current direction of a heating coil 21 disposed on one side (upper side) of the end surface 103 of the open trim edge 101 is opposite to a current direction of a heating coil 22 disposed on the other side (lower side) of the end surface 103 of the open trim edge 101.

Thus, a loop of current is formed along the end surface 103 of the open trim edge 101, and the current can be concentrated on this end surface 103. Therefore, the current density at the end surface 103 of the open trim edge 101 can be increased, and thus the heating efficiency of this end surface 103 can be improved.

Figure 5:
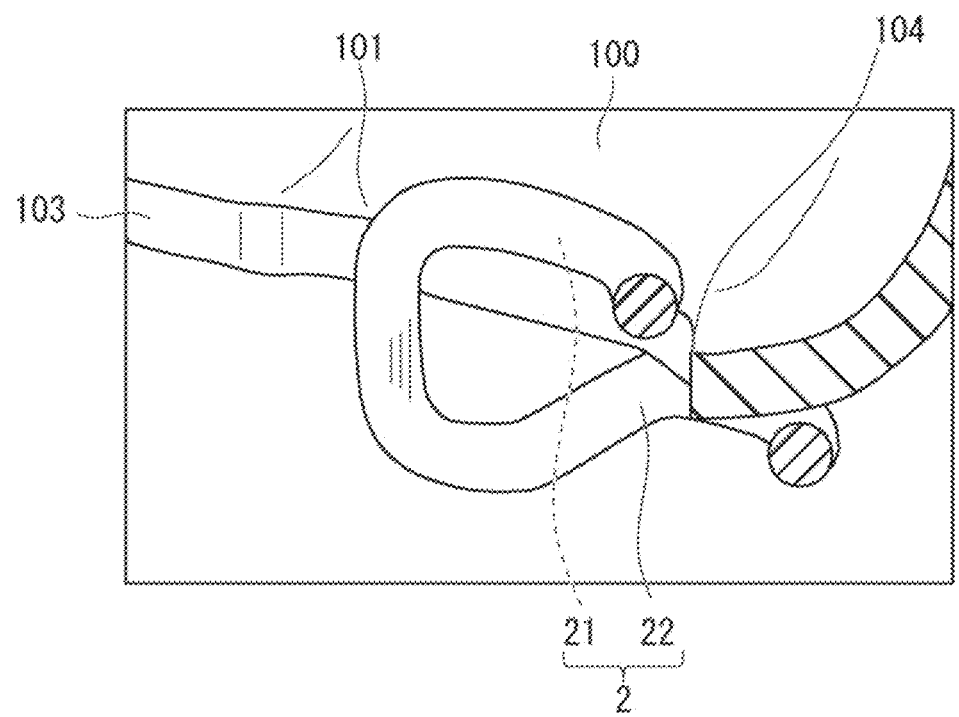
FIG. 5 is a cross-sectional view of the heating coil disposed at an open trim edge when cut vertically.

FIG. 5 is a cross-sectional view of the heating coil disposed at the open trim edge when it is cut vertically. In the heating step, as shown in FIG. 5, the heating coil 21 on the upper side of the end surface 103 of the open trim edge 101 is disposed on the open side, and the heating coil 22 on the lower side of the end surface 103 of the open trim edge 101 is disposed on the steel plate side.

Figure 6:
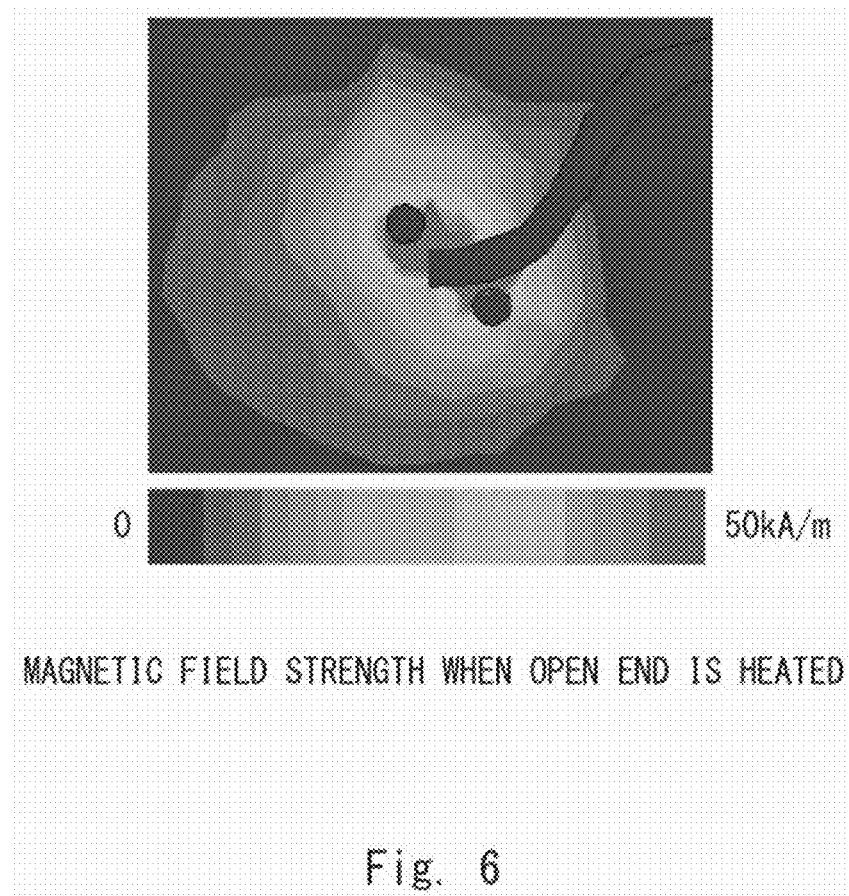
FIG. 6 shows magnetic field strength of the open trim edge.
Figure 7:
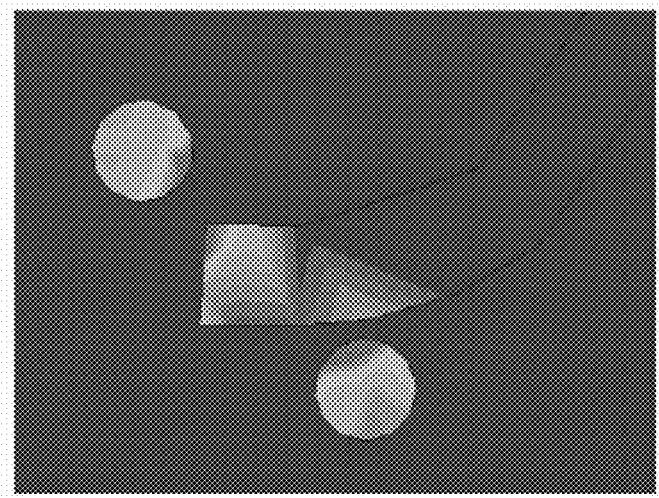
FIG. 7 shows current density of the open trim edge.

As a result, the open trim edge 101 is sandwiched diagonally between the upper heating coil 21 and the lower heating coil 22, and is sandwiched diagonally between the magnetic fields as shown in FIG. 6. Therefore, stable heating can be performed even if the upper heating coil 21 and the lower heating coil 22 are slightly displaced from their established positions. Moreover, as shown in FIG. 7, a strong current flows starting from an upper angle 104 of the end surface 103 of the open trim edge 101, and the heating efficiency of the end surface 103 of the open trim edge 101 can be further improved.

In general, when heating is performed while sandwiching the end surface of the open trim edge using the upper and lower heating coils, the temperature peaks right below the upper and lower heating coils. Therefore, when a relative positional relationship between the upper and lower heating coils and the end surface of the open trim edge changes, the position of the temperature peak also changes. Therefore, in order to intensively heat the end surface of the open trim edge, it is particularly important to manage the relative positional relationship.

In contrast, in this embodiment, as described above, the open trim edge 101 is sandwiched diagonally between the upper heating coil 21 and the lower heating coil 22. In this manner, since the temperature peaks starting from at the upper angle 104 of the end surface 103 of the open trim edge 101, the management of the relative positional relationship between the upper heating coil 21 and the lower heating coil 22 and the end surface 103 of the open trim edge 101 becomes less strict. Therefore, the end surface 103 of the open trim edge 101 can be intensively heated even if the relative positional relationship slightly changes from the established relationship.

Figure 8:
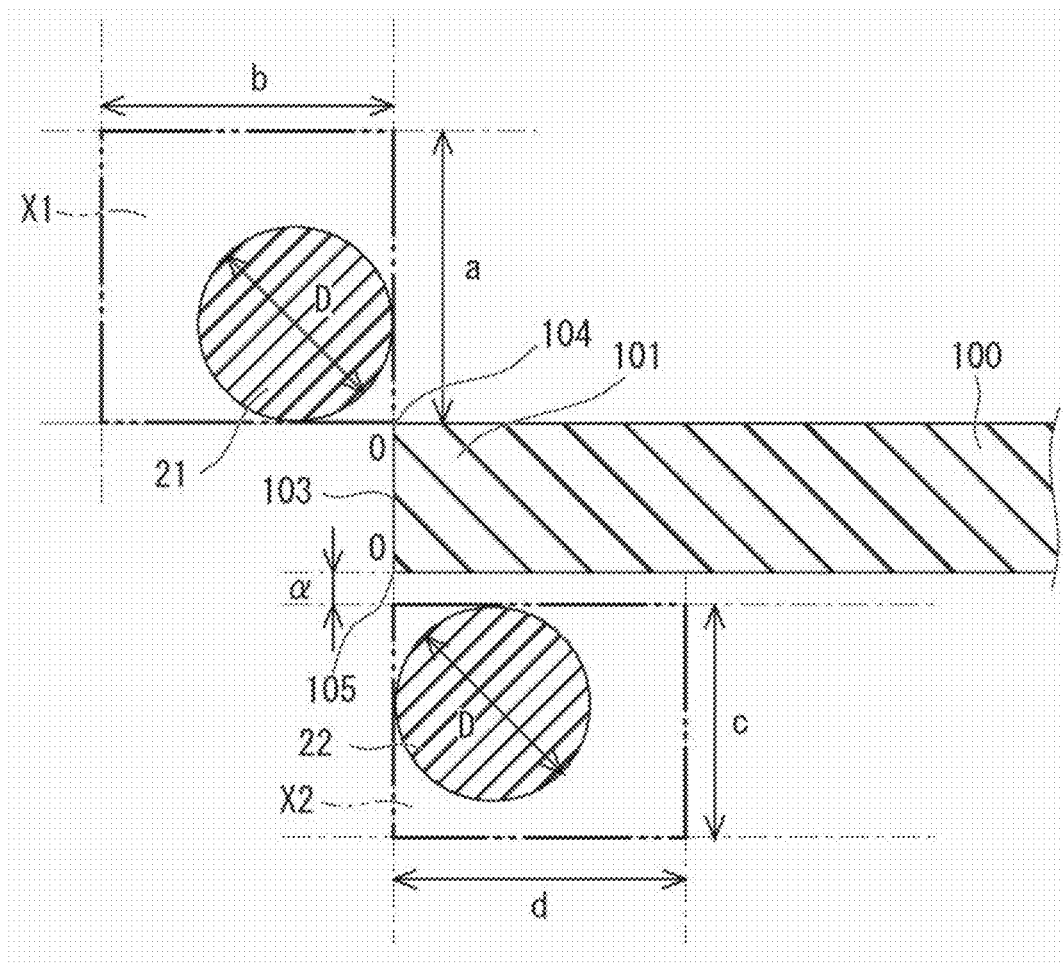
FIG. 8 shows a proper arrangement of upper and lower heating coils.

Next, a proper relative positional relationship between the upper heating coil 21 and the lower heating coil 22 and the end surface 103 of the open trim edge 101 will be described in detail. FIG. 8 shows a proper arrangement of the upper and lower heating coils.

As shown in FIG. 8, in the cross-sectional view of the open trim edge 101 and the upper heating coil 21 and the lower heating coil 22, it is preferable that, when viewed from the vertical direction, the cross section of the upper heating coil 21 do not overlap the cross section of the open trim edge 101 and the cross section of the lower heating coil 22 overlap the cross section of the open trim edge 101. As a result, the open trim edge 101 is sandwiched diagonally between the upper heating coil 21 and the lower heating coil 22, and stable heating can be performed even if the upper heating coil 21 and the lower heating coil 22 are slightly displaced from the established positions.

It is preferable that the upper heating coil 21 be disposed within the rectangular upper proper range X1 of a length a and a width b, and the lower heating coil 22 be disposed within a rectangular lower proper range X2 of a length c and a width d.

The upper proper range X1 is set upward and to the left starting from the upper angle 104 of the end surface 103 of the open trim edge 101. The lower proper range X2 is set downward and to the right starting from a position a predetermined distance α from a lower angle 105 of the end surface 103 of the open trim edge 101.

Further, when the diameters of the upper heating coil 21 and the lower heating coil 22 are defined as D, and the following relationship is preferably satisfied. The predetermined distance α is defined taking into account the machining error of the open trim edge 101, for example, about 0.5 mm.

$0 \leq a \leq 1.5 \times D$ $0 \leq b \leq 1.5 \times D$ $\alpha \leq c \leq 1.2 \times D$ $0 \leq d \leq 1.5 \times D$ As described above, high heating efficiency can be maintained by disposing the upper heating coil 21 within the upper proper range X1, the lower heating coil 22 within the lower proper range X2, and then heating the end surface 103 of the open trim edge 101.

It is more preferable that the upper heating coil 21 be disposed closest to the end surface 103 of the open trim edge 101 within the upper proper range X1, taking into account the machining error of the open trim edge 101. Similarly, it is more preferable that the lower heating coil 22 be disposed closest to the end surface 103 of the open trim edge 101 within the lower proper range X2, taking into account the machining error of the open trim edge 101. In this way, the heating efficiency can be further enhanced.

Figure 9:
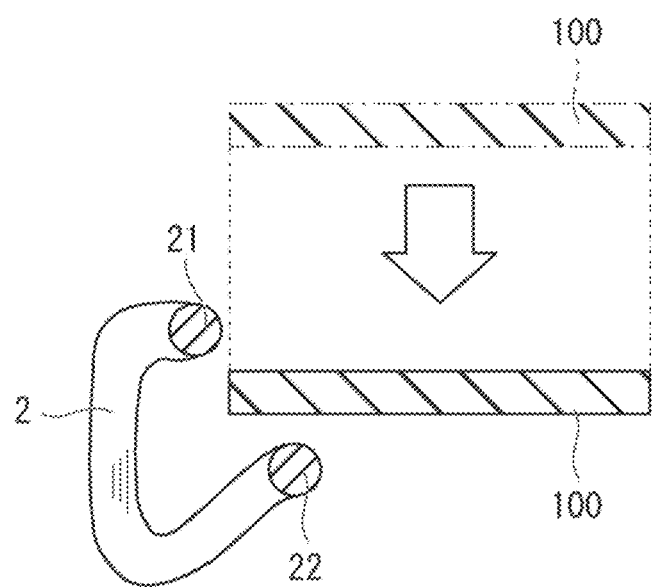
FIG. 9 shows an arrangement of the open trim edge of the steel plate with respect to the heating coil of a heating jig.

When the steel plate 100 punched in the punching step is placed on the heating jig 200, it is preferable that the upper heating coil 21 be offset to the outer side of the steel plate 100, as shown in FIG. 5. Thus, when the open trim edge 101 of the steel plate 100 is disposed for the heating coil 2 of the heating jig 200 in the heating step, for example, as shown in FIG. 9, it is only necessary to lower the steel plate 100 straight down, and thus the installability of the steel plate 100 can be improved.

In the above embodiment, the distance between the center axis of the heating coil 2 disposed on the side of the steel plate 100 to be stretched and the end surface 103 of the open trim edge 101 in the processing step may be shorter than the distance between the center axis of the heating coil 2 disposed on the side of the steel plate 100 opposite to the side of the steel plate 100 to be stretched and the end surface 103 of the open trim edge 101.

Thus, by bringing the heating coil 2 disposed on the side of the steel plate 100 to be stretched closer to the end surface 103 of the open trim edge 101 in the processing step, the stretched part of the steel plate 100 can be heated to a greater extent, and the workability can be improved.

Also, in the above embodiment, as shown in FIG. 3, one heating coil 21 is disposed on the upper side, one heating coil 22 is disposed on the lower side, and the upper heating coil 21 and the lower heating coil 22 form a loop, but the present disclosure is not limited to this.

Figure 10:
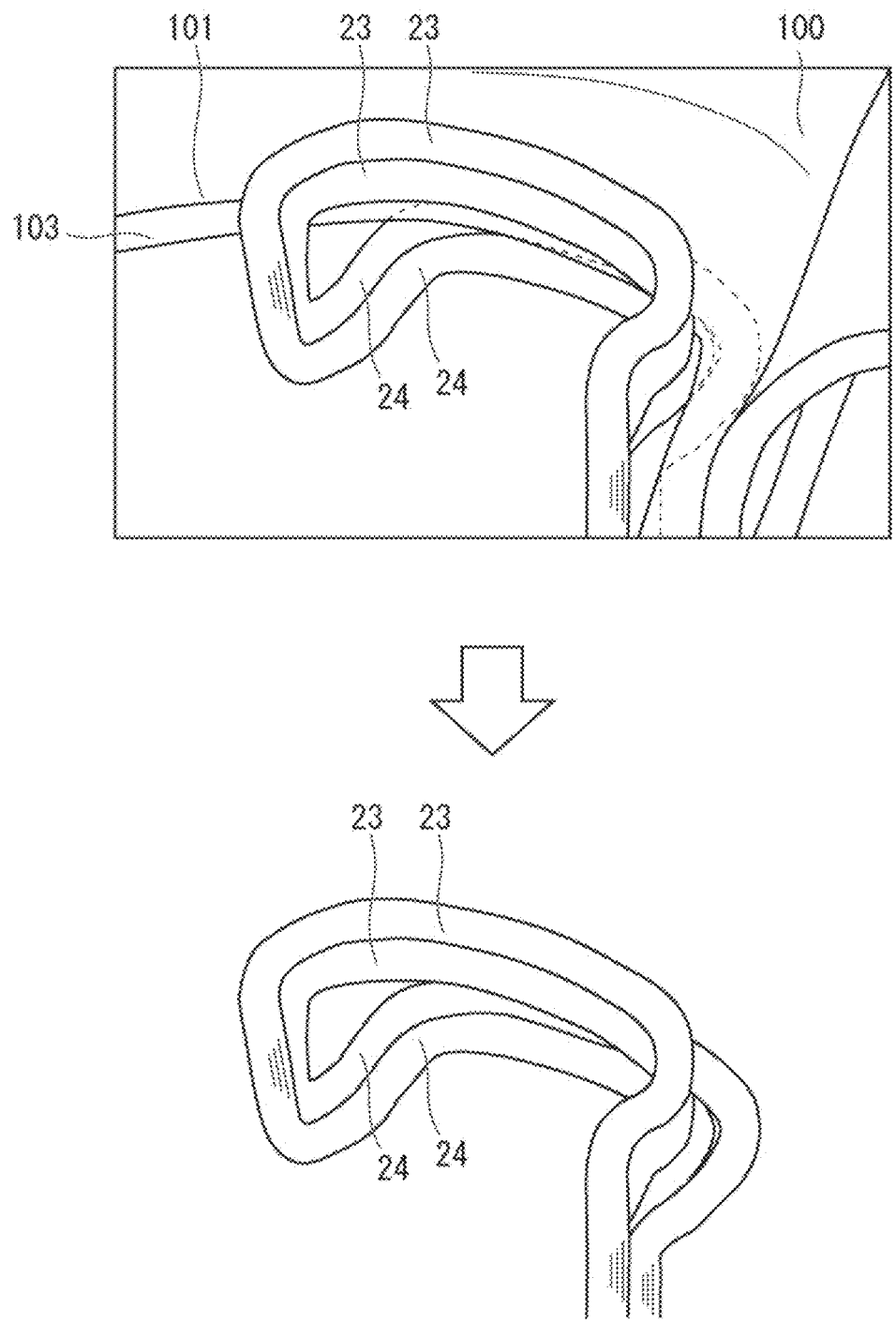
FIG. 10 shows a configuration in which the two upper heating coils are disposed and the lower two heating coils are disposed.

For example, as shown in FIG. 10, two upper heating coils 23 may be disposed, the two lower heating coils 24 may be disposed, and the upper and lower heating coils 23 and 24 may form a loop.

In this manner, the coil inductance can be increased and the heating efficiency can be further enhanced. In addition, since the range of the influence of the magnetic field by the upper and lower heating coils 23 and 24 becomes wider, the robustness of the relative positional relationship between the upper and lower heating coils 23 and 24 and the end surface 103 of the open trim edge 101 is improved and thus more stable heating can be achieved.

The upper drawing of FIG. 10 is a perspective view of the upper and lower heating coils disposed at the open trim edge 101 from an oblique angle. The lower drawing of FIG. 10 is a perspective view of the upper and lower heating coils from an oblique angle.

As shown in FIG. 10, the two upper heating coils 23 and the two lower heating coils 24 are disposed in a non-contact manner along the end surface 103 of the open trim edge 101 in such a way that the end surface 103 of the open trim edge 101 is sandwiched between the heating coils. The two upper heating coils 23 are disposed on the open side and the two lower heating coils 24 are disposed on the steel plate side. The current direction of the two upper heating coils 23 is opposite to the current direction of the two lower heating coils 24.

Thus, a loop of current is formed by the two upper heating coils 23 and the two lower heating coils 24 along the end surface 103 of the open trim edge 101, and the current can be concentrated on this end surface 103. Therefore, the current density at the end surface 103 of the open trim edge 101 can be increased, and thus the heating efficiency of this end surface 103 can be improved.

Furthermore, in the above embodiment, as shown in FIG. 4, the configuration in which the upper heating coil 21 is disposed on the open side, the lower heating coil 22 is disposed on the steel plate side, and the upper heating coil 21 and the lower heating coil 22 are offset as seen from the upper direction is explained. However, the present disclosure is not limited to this. For example, as shown in FIG. 11, the upper heating coil 21 and the lower heating coil 22 may not offset as seen from the upper direction, and they may overlap each other.

Figure 11:
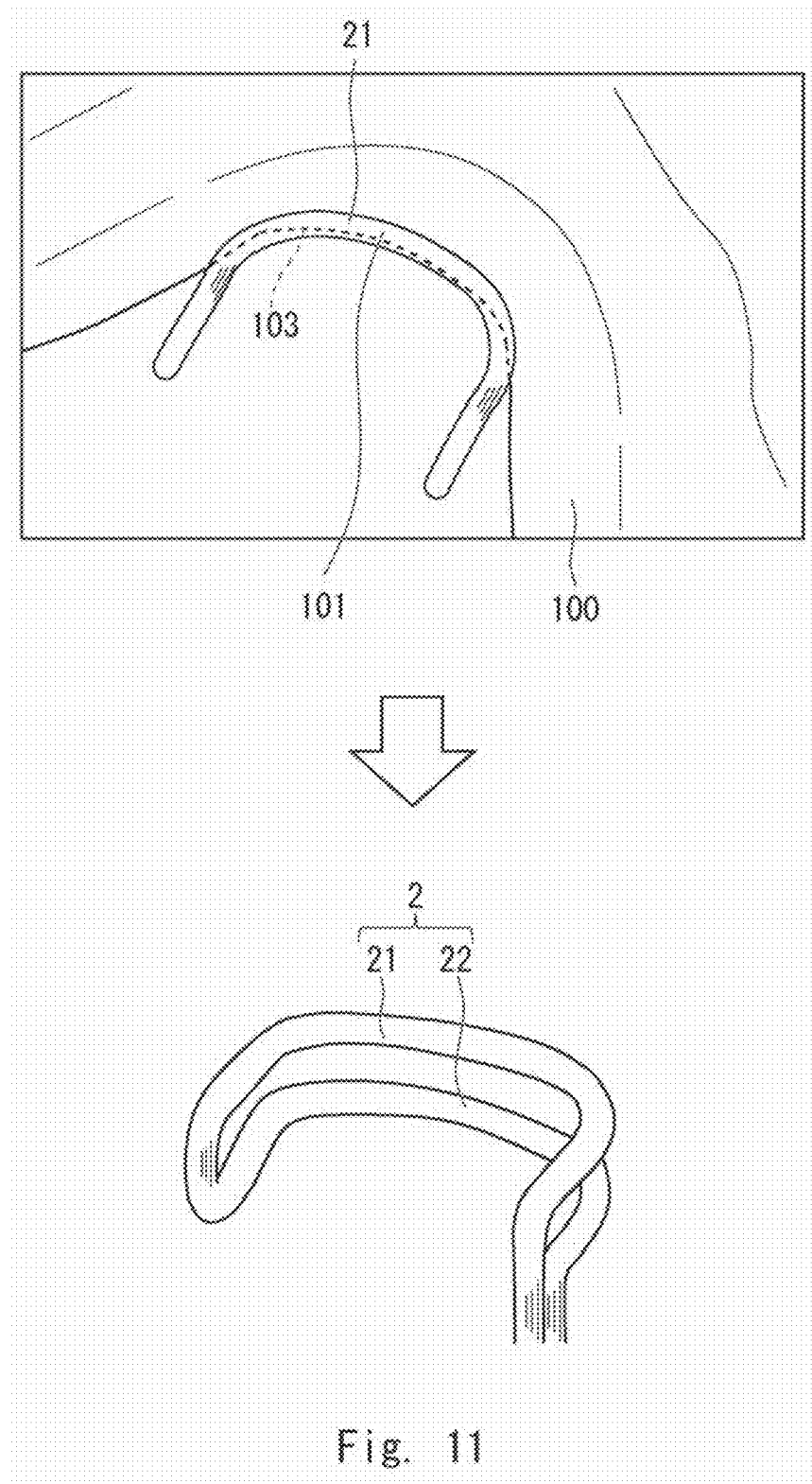
FIG. 11 shows a configuration in which the upper and lower coils overlap when viewed from an upper direction.

The upper drawing of FIG. 11 is an upper view of the upper heating coil 21 and the lower heating coil 22 disposed at the open trim edge 101. The lower drawing of FIG. 11 is a perspective view of the upper heating coil 21 and the lower heating coil 22 viewed from an oblique direction. As shown in FIG. 11, the upper heating coil 21 and the lower heating coil 22 are disposed in a non-contact manner along the end surface 103 of the open trim edge 101 in such a way that the end surface 103 of the open trim edge 101 is sandwiched between the heating coils.

This makes it possible to form a loop of current along the end surface 103 of the open trim edge 101 and to concentrate the current on this end surface 103. Therefore, the current density at the end surface 103 of the open trim edge 101 can be increased, and thus the heating efficiency of this end surface 103 can be improved.

Figure 12:
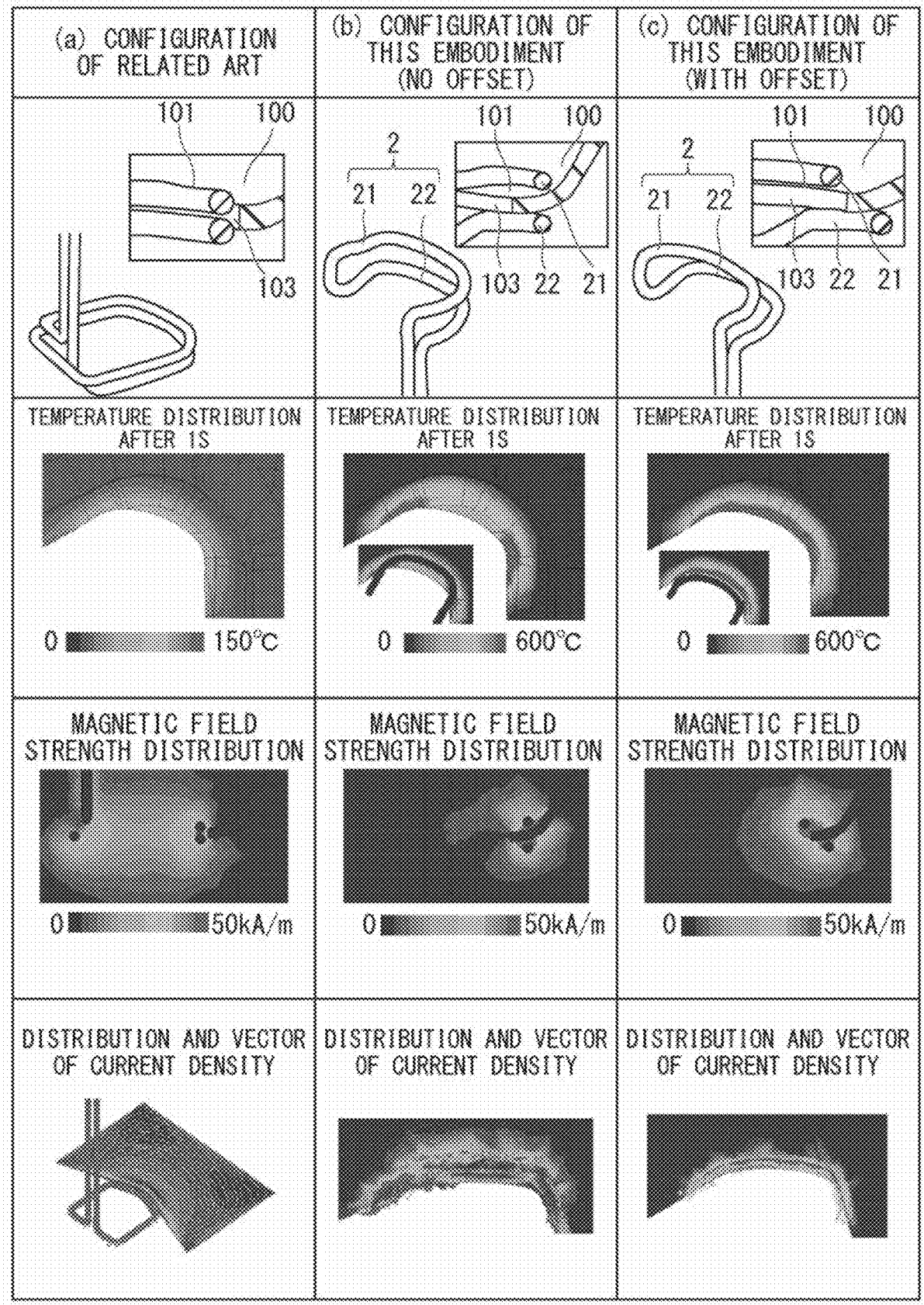
FIG. 12 shows heating results when an end surface of the open trim edge was heated by a heating coil according to related art and a heating coil according to the embodiment.

Next, the end surface 103 of the open trim edge 101 was heated by each of the heating coil according to related art and the heating coil 2 according to this embodiment, and the heating results were compared. FIG. 12 shows the heating results when the end surface 103 of the open trim edge 101 was heated by each of the heating coil according to related art and the heating coil according to this embodiment. In this experiment, the temperature distribution and the magnetic field strength distribution of the open trim edge 101 of the steel plate 100, and the distribution and vector of the current density when an alternating current with a frequency of 340 kHz was applied to the heating coil 2 at a constant voltage of 200 V for 1 second are analyzed.

In FIG. 12, the experimental results of (a) the configuration of a heating coil according to related art shaped along the end surface 103 of the open trim edge 101 are shown on the left side, the experimental results of (b) the configuration in which the upper heating coil 21 and the lower heating coil 22 according to this embodiment are not offset as viewed from the upper direction are shown on the center, and the experimental results of (c) the configuration in which the upper heating coil 21 and the lower heating coil 22 according to this embodiment are offset as viewed from the upper direction are shown on the right side.

In FIG. 12, the temperature distributions are shown on the second column, the magnetic field strength distributions are shown on the third column, and the current density distributions and vectors are shown on the fourth column.

As shown in the temperature distributions in FIG. 12, it can be confirmed that (b) and (c) the configurations according to this embodiment have a remarkable increase in the temperature of the end surface 103 of the open trim edge 101 and satisfactory heating efficiency compared with those of the configuration according to related art.

In addition, it can be confirmed that (c) the configuration with the offset according to this embodiment receives a strong magnetic field starting at the upper angle 104 of the end surface 103 of the open trim edge 101 compared with (b) the configuration without the offset according to this embodiment, and therefore, the temperature increases significantly starting at the upper angle 104.

When heating is performed while sandwiching the end surface 103 of the open trim edge 101 between the upper heating coil 21 and the and lower heating coil 22, the temperature peaks right below the upper heating coil 21 and the lower heating coil 22.

For this reason, in the case of (b) the configuration without an offset according to this embodiment, it is necessary to dispose the upper heating coil 21 and the lower heating coil 22 with respect to the end surface 103 of the open trim edge 101 with pinpoint accuracy, and to precisely align the relative positional relationship between the upper heating coil 21 and the lower heating coil 22 and the end surface 103 of the open trim edge 101.

On the other hand, in (c) the configuration with an offset according to this embodiment, the open trim edge 101 is sandwiched diagonally between the upper heating coil 21 and the lower heating coil 22. This makes the upper angle 104 of the end surface 103 of the open trim edge 101 the starting point, and since this is the temperature peak, the management of the relative positional relationship between the upper heating coil 21 and the lower heating coil 22 and the end surface 103 of the open trim edge 101 becomes less strict.

Therefore, in terms of such robustness, (c) the configuration with an offset according to this embodiment is considered to be superior to (b) the configuration without an offset according to this embodiment.

Furthermore, as shown by the current density distribution and vector in FIG. 12, in the case of (a) the configuration according to related art, the induced current flowing through the end surface 103 of the open trim edge 101 along the heating coil is dispersed away from the end surface and flows in the direction opposite to the direction in which the induced current flows through the end surface 103 inside the steel plate to form a loop, resulting in reduced heating efficiency.

On the other hand, in the case of (b) and (c) the configuration according to this embodiment, the induced current flows intensively through the end surface 103 of the open trim edge 101 right below the heating coils 21 and 22, so that the temperature peak almost matches the end surface 103 of the open trim edge 101 where heating is intended to be applied, indicating high heating efficiency.

In particular, in the case of (c) the configuration according to this embodiment, the induced current flows intensively through the opposite face of the plate thickness, starting at the upper angle 104 of the open trim edge 101, so that the temperature peak is formed starting from this upper angle 104, indicating that the end surface 103 of the open trim edge 101 can be heated more intensively.

Next, for (b) the configuration without an offset according to this embodiment and (c) the configuration with an offset according to this embodiment, experiments were carried out in which heating was performed while moving the upper heating coil 21 and the lower heating coil 22 to observe changes in the temperature distribution.

In this experiment, for (b) the configuration without an offset according to this embodiment, the change in the temperature distribution was analyzed when the upper and lower heating coils were moved from the reference position to an outer side of the steel plate and when they were moved to an inner side of the steel plate.

Similarly, for (c) the configuration with an offset according to this embodiment, the change in the temperature distribution was analyzed when the upper heating coil 21 and the lower heating coil 22 were moved from the reference position to an outer side of the steel plate 100 and when they were moved to a lower side of the steel plate 100.

Figure 13:
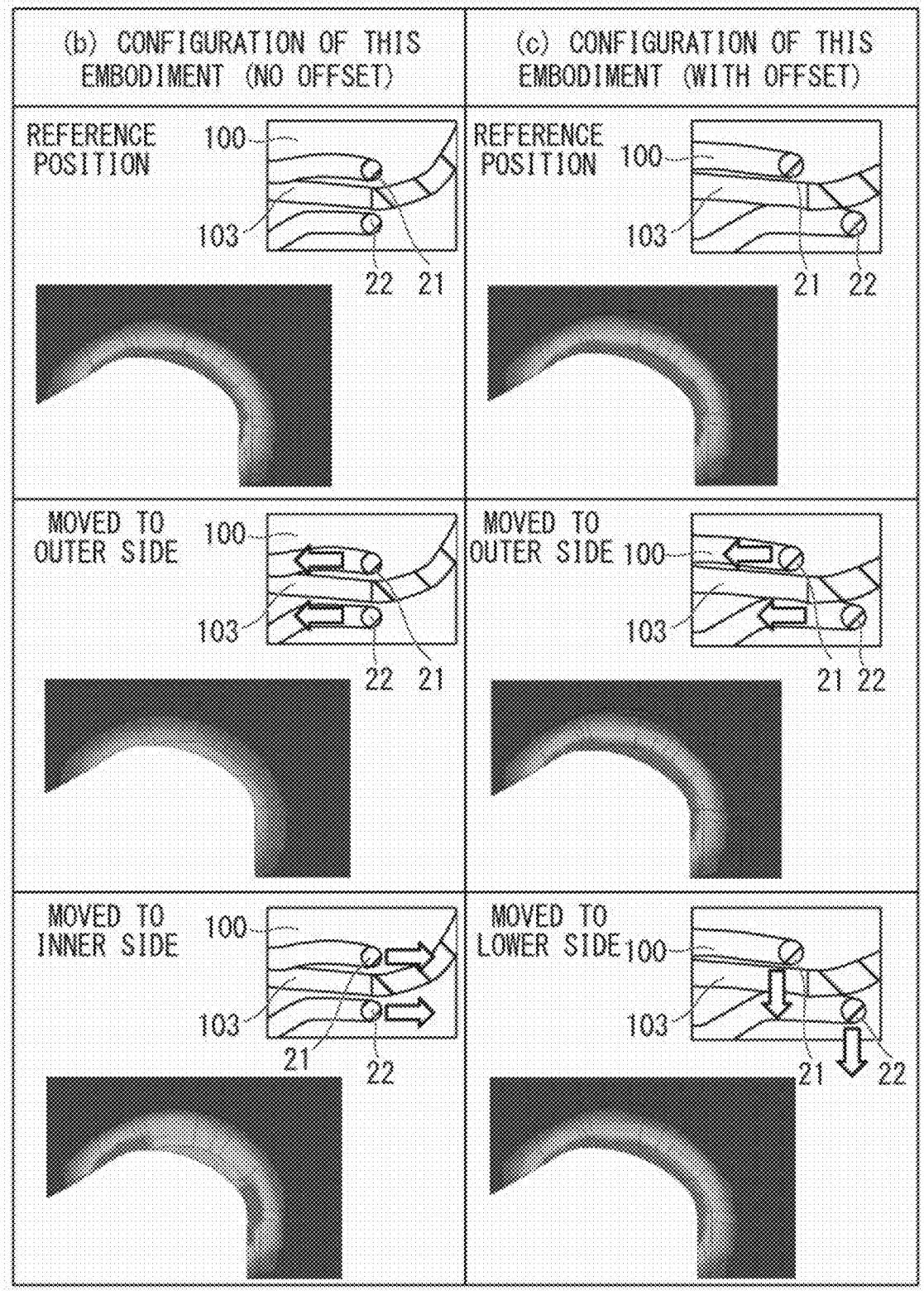
FIG. 13 shows a relationship between the upper and lower heating coils and a temperature distribution, which is an experimental result.

FIG. 13 shows the relationship between the upper and lower heating coils and the temperature distribution, which is a result of the above experiment. In FIG. 13, the drawing on the left side shows the change in the temperature distribution of (b) the configuration without an offset according to this embodiment, and the drawing on the right side shows the change in the temperature distribution of (b) the configuration with an offset according to this embodiment.

As shown in FIG. 13, it can be seen that in (b) the configuration without an offset according to this embodiment, when the upper heating coil 21 and the lower heating coil 22 are moved from the reference position to the outer side or inner side of the steel plate 100, the relative positional relationship between the upper heating coil 21 and the lower heating coil 22 and the end surface 103 of the open trim edge 101 changes, and the position of the temperature peak also changes. Therefore, in order to intensively heat the end surface 103 of the open trim edge 101, it is particularly important to manage the relative positional relationship between the upper heating coil 21 and the lower heating coil 22 and the end surface 103 of the open trim edge 101.

On the other hand, it can be seen that when the upper heating coil 21 and the and lower heating coil 22 are moved from the reference position to the outer side or the underside of the steel plate 100 in (c) the configuration with an offset according to this embodiment, the relative positional relationship between the upper heating coil 21 and the lower heating coil 22 and the end surface 103 of the open trim edge 101 changes, but the position of the temperature peak does not change much. Thus, even if the relative positional relationship between the upper heating coil 21 and the lower heating coil 22 and the end surface 103 of the open trim edge 101 changes slightly, the end surface 103 of the open trim edge 101 can be intensively heated, and thus the heating can be performed more stably.

Figure 14:
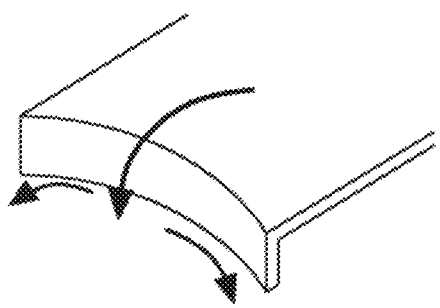
FIG. 14 shows a formed product including a stretch flange-formed part.

Next, an example of a formed product produced by the processing method according to this embodiment will be described. A formed product produced by the processing method according to this embodiment is a formed product including a stretch flange-formed part, such as a flange-formed part for erecting a curved flange, as shown in FIG. 14, and a formed product including a formed part where a line length of the end surface 103 is significantly increased after machining.

In the heating step described above, the heating coil 2 preferably heats, for example, the curved flange-formed part of the framework member of the high tensile strength steel of the vehicle formed in the processing step. In this manner, the processing part, whose line length of the end surface is significantly increased after the heating, can be machined.

Figure 15:
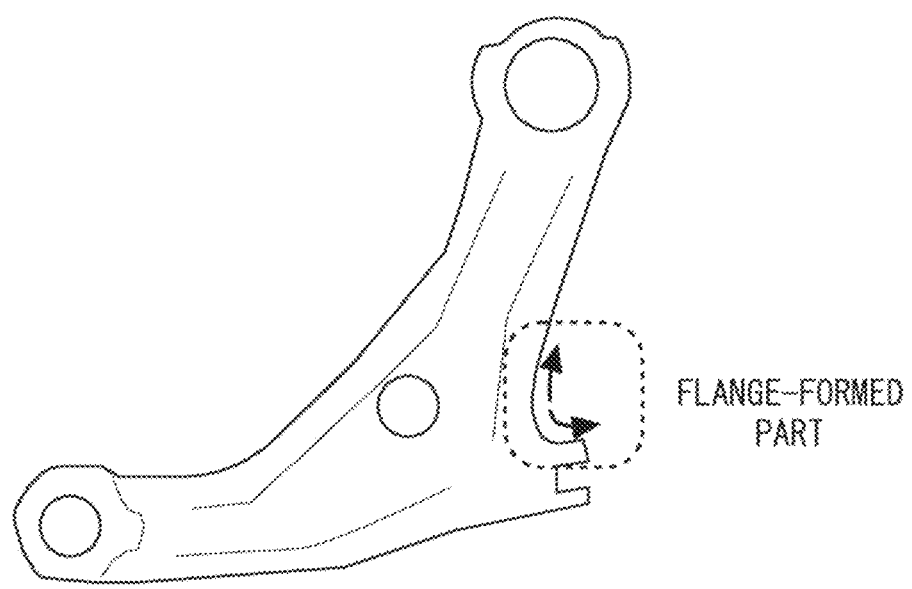
FIG. 15 shows a specific example of a formed product of an FR lower arm.

As a specific formed product, an FR lower arm used for vehicle suspension is assumed, as shown in FIG. 15. In FIG. 15, the flange-formed part such as the crotch surrounded by the dotted line may be formed by the processing method according to this embodiment.

In the processing step, for example, the stretch flange is formed by pressing a flange die or the like against the open trim edge 101 where the unnecessary part is cut off. As described below, the flange-formed part of an A-pillar lower part or the B-pillar outer lower part is formed in this way.

Figure 16:
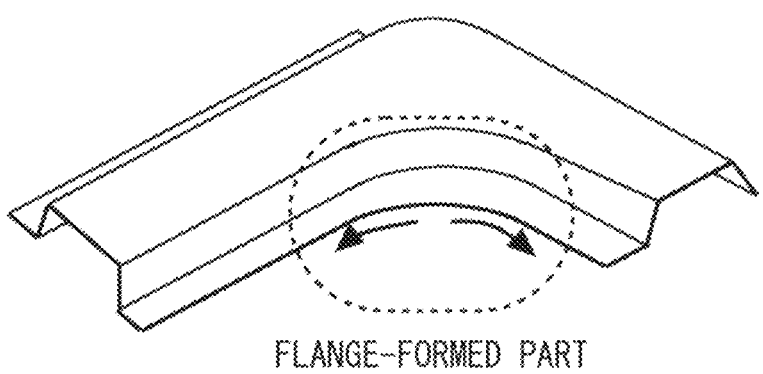
FIG. 16 shows a specific example of a formed product of an A pillar lower part.

As shown in FIG. 16, an A-pillar lower part used for the window column of a vehicle is assumed as the above formed product. In FIG. 16, the flange-formed part such as a corner part surrounded by the dotted line may be formed by the processing method according to this embodiment.

Figure 17:
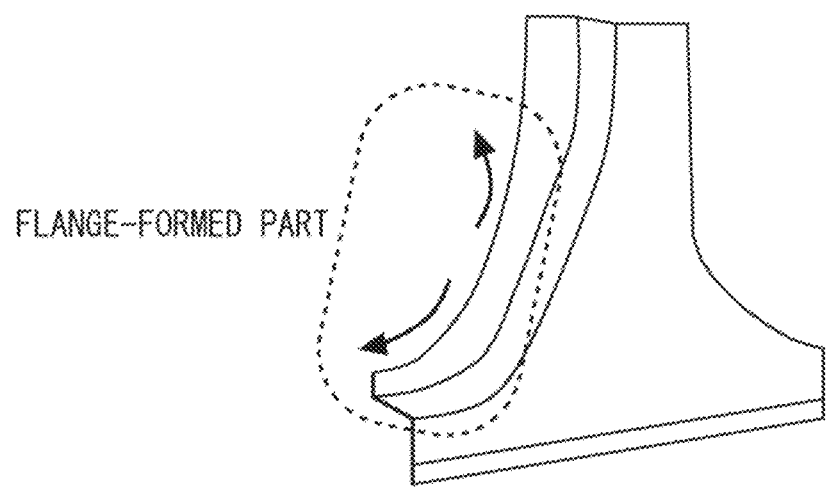
FIG. 17 shows a specific example of a formed product of a B pillar outer lower part.

As another formed product, a B-pillar outer lower part of the vehicle is assumed as shown in FIG. 17. In FIG. 17, the flange-formed part such as the corner part surrounded by dotted lines may be formed by the processing method according to this embodiment.

As described above, the processing method according to this embodiment includes: punching the steel plate 100 to open a part of the end surface 103 of the steel plate 100 to form the open trim edge 101; and disposing the heating coil 2 in a non-contact manner along the end surface 103 of the open trim edge 101 formed in the punching to sandwich the end surface 103 of the open trim edge 101 therebetween, and heating the end surface 103 of the open trim edge 101 by applying an alternating current to the heating coil 2 to generate an induced electromotive force on the steel plate 100. A current direction of the heating coil 21 disposed on one side of the end surface 103 of the open trim edge 101 is opposite to a current direction of the heating coil 22 disposed on another side of the end surface 103 of the open trim edge 101.

Thus, a loop of current is formed along the end surface 103 of the open trim edge 101, and the current can be concentrated on this end surface 103. Therefore, the current density at the end surface 103 of the open trim edge 101 can be increased, and thus the heating efficiency of this end surface 103 can be improved.

Second Embodiment

Figure 18:
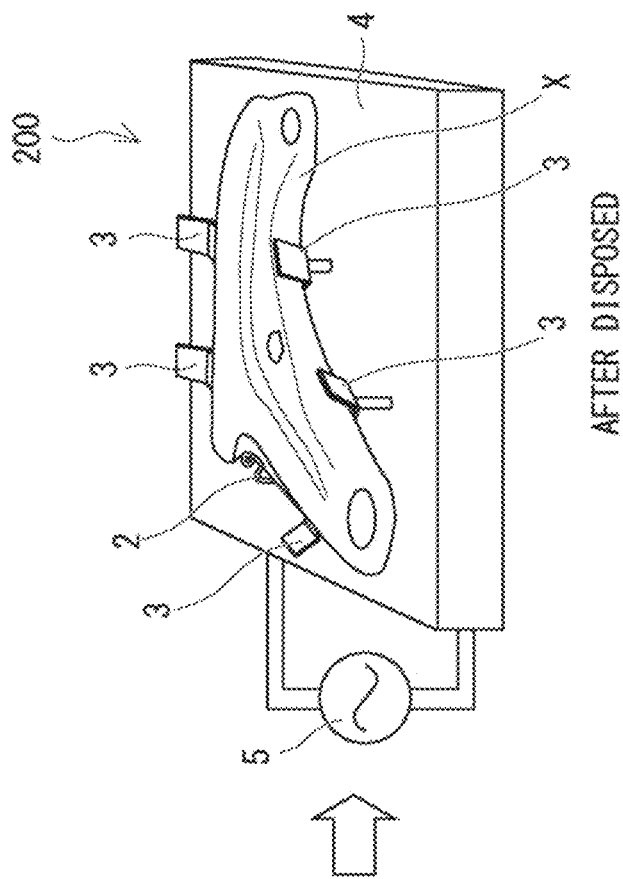
FIG. 18 shows an example of a heating jig.
Figure 18:
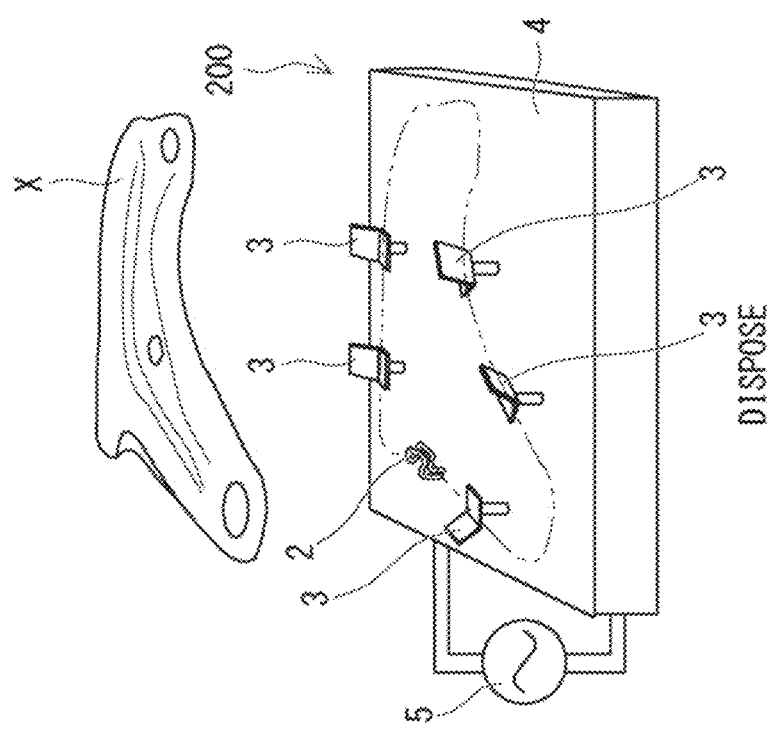

FIG. 18 shows an example of a heating jig. The left drawing of FIG. 18 shows a state of a steel plate formed product X before it is disposed on the heating jig 200, and the right drawing of FIG. 18 shows the state of the steel plate formed product X after it is disposed on the heating jig 200. In this embodiment, the steel plate formed product punched in the above punching step is disposed on the heating jig 200 in the heating step and then is heated.

As shown in FIG. 18, the heating jig 200 has the heating coil 2 for heating the open trim edge 101 of the steel plate formed product X, the positioning guide 3 for positioning the steel plate formed product X at a predetermined position, and the base part 4. An alternating-current power source 5 for supplying power to the heating coil 2 is connected to the heating coil 2.

The shape and arrangement of the positioning guide 3 are configured so that the position of the steel plate formed product X is automatically set by simply disposing the steel plate formed product X on the positioning guide 3. The heating coil 2 and the positioning guide 3 are disposed on the base part 4 corresponding to the shape of the steel plate formed product X and the position of the heating part.

The position, number, and shape of the heating coils 2 are not limited to the example shown in FIG. 18 and can be configured in any way. Similarly, the position, number, and shape of the positioning guide 3 are not limited to the example shown in FIG. 18 and can be configured in any way.

By using the heating jig 200 according to this embodiment, it is not necessary to perform heating from the vertical direction while the steel plate formed product X is held as in the method according to related art, and the steel plate formed product X can be simply disposed on the heating jig 200 and then heated.

As shown in FIG. 19, the heating step according to this embodiment may be performed in an idling step between the punching step and the processing step. The idling step is for adjusting a conveying pitch when the steel plate formed product X is conveyed from the punching step to the processing step, and is a standby step without processing.

This makes it possible to efficiently heat the steel plate formed product X by using the idling step, which has been making the punched steel plate formed product X wait after the punching step and before the processing step. Therefore, there is no need to introduce an additional heating step, thus improving productivity.

Moreover, according to this embodiment, by simply disposing the heating jig 200 in the idling step in a normal pressing machine, the idling step can be converted into a heating step, so that the number of steps is not increased.

FIG. 20 is a schematic diagram showing an example of steps in a pressing machine. In a pressing machine 500, for example, the processing step, the punching step, the idling step, the idling step, and the punching step shown in the upper column of FIG. 20 are continuously carried out at a predetermined conveying pitch while the steel plate formed product X is continuously conveyed by fingers (holding parts) 501 shown in the lower column of FIG. 20. Therefore, the idling step in the pressing machine 500 can be easily replaced by the heating step by simply placing the heating jig 200 at the position corresponding to the idling step.

The heating step may be carried out during any step of the processing method in the pressing machine 500, for example, during the processing step or during the punching step, if the heating jig 200 can be disposed.

Although some of the embodiments of the disclosure have been described, these are presented as examples and are not intended to limit the scope of the disclosure. These new embodiments can be implemented in various other forms, and various omissions, replacements, and modifications can be made to the extent that they do not deviate from the scope of the disclosure. These embodiments and their variations are included in the scope and scope of the disclosure, as well as in the equal scope of the disclosure described in the claims.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A processing method comprising:
   punching a steel plate to open a part of an end surface of the steel plate to form an open trim edge;
   disposing a heating coil in a non-contact manner along the end surface of the open trim edge formed in the punching to sandwich the end surface of the open trim edge therebetween, so that the heating coil is disposed on a first side of the end surface of the open trim edge and on a second side of the end surface of the open trim edge; and
   heating the end surface of the open trim edge by applying an alternating current to the heating coil to generate an induced electromotive force on the steel plate, wherein
   a current direction of the heating coil that is disposed on the first side of the end surface of the open trim edge is opposite to a current direction of the heating coil that is disposed on the second side of the end surface of the open trim edge.

2. The processing method according to claim 1, wherein in the heating,
   the heating coil on the first side of the end surface of the open trim edge is disposed on a side of the opened part of the end surface of the steel plate, and the heating coil on the second side of the end surface of the open trim edge is disposed on a side of the steel plate.

3. The processing method according to claim 2, in the heating, the first side on which the heating coil is disposed is an upper side of the end surface and the second side on which the heating coil is disposed is a lower side of the end surface, and in a cross-sectional view of the open trim edge, the heating coil disposed on the first side of the end surface of the open trim edge is an upper heating coil, and the heating coil on the second side of the end surface of the open trim edge is a lower heating coil, viewed from a vertical direction, a cross-section of the upper heating coil does not overlap a cross-section of the open trim edge, while a cross-section of the lower heating coil overlaps the cross-section of the open trim edge.

4. The processing method according to claim 3, wherein the upper heating coil is disposed within a rectangular upper proper range having a length a and a width b, the lower heating coil is disposed within a rectangular lower proper range having a length c and a width d, the upper proper range is set starting from an upper angle of the end surface of the open trim edge, the lower proper range is set starting from a position a predetermined distance α from a lower angle of the end surface of the open trim edge, and when diameters of the upper heating coil, and the lower heating coil are defined as D, the following relation holds:

$0 \leq a \leq 1.5 \times D$ $0 \leq b \leq 1.5 \times D$ $\alpha \leq c \leq 1.2 \times D$ $0 \leq d \leq 1.5 \times D$.

5. The processing method according to claim 1, further comprising forming a stretch flange at the open trim edge on the first side of the steel plate, wherein a distance between a central axis of the heating coil disposed on the first side of the steel plate to be stretched and the end surface of the open trim edge is shorter than a distance between a central axis of the heating coil disposed on the second side of the steel plate opposite to the first side of the steel plate to be stretched and the end surface of the open trim edge.

6. The processing method according to claim 1, wherein the steel plate punched in the punching is disposed on a heating jig and then heated by the heating coil in the heating, the heating jig includes a positioning guide on which the steel plate punched in the punching is placed and which is for positioning the steel plate in a predetermined position, and heating is performed by the heating coil on the end surface of the open trim edge of the steel plate, and when the steel plate punched in the punching is placed on the positioning guide, the heating coil positioned on a front side is offset to an outer side of the steel plate.

7. The processing method according to claim 6, wherein the heating is performed during any step of the processing method in a pressing machine.

8. The processing method according to claim 7, further comprising:

forming a stretch flange at the trim edge, wherein the heating is carried out in idling for adjusting a conveying pitch when the steel plate is conveyed from a place where the punching is performed to a place where the forming is performed.

9. The processing method according to claim 8, further comprising:

in the pressing machine, while the steel plate formed product is continuously conveyed by a holding part, at least the punching and the idling are continuously carried out at a predetermined conveying pitch, wherein by disposing the heating jig at a position corresponding to the idling, the idling is replaced by the heating.

10. The processing method according to claim 1, further comprising forming a stretch flange at the open trim edge, wherein in the heating, the heating coil heats a curved flange-formed part of a framework member of a high tensile strength steel of a vehicle formed in the forming of the stretch flange.

* * * * *